US009233850B2

(12) United States Patent
Jang et al.

(10) Patent No.: US 9,233,850 B2
(45) Date of Patent: Jan. 12, 2016

(54) NANO-SCALED GRAPHENE PLATE FILMS AND ARTICLES

(75) Inventors: Bor Z. Jang, Centerville, OH (US); Aruna Zhamu, Centerville, OH (US); Jiusheng Guo, Centerville, OH (US)

(73) Assignee: Nanotek Instruments, Inc., Dayton, OH (US)

( * ) Notice: Subject to any disclaimer, the term of this patent is extended or adjusted under 35 U.S.C. 154(b) by 1491 days.

(21) Appl. No.: 11/784,606

(22) Filed: Apr. 9, 2007

(65) Prior Publication Data

US 2008/0248275 A1    Oct. 9, 2008

(51) Int. Cl.
| | |
|---|---|
| *H01B 1/04* | (2006.01) |
| *C01B 31/00* | (2006.01) |
| *C01B 31/04* | (2006.01) |
| *B82Y 30/00* | (2011.01) |
| *B82Y 40/00* | (2011.01) |
| *C04B 35/52* | (2006.01) |

(52) U.S. Cl.
CPC ............ *C01B 31/0423* (2013.01); *B82Y 30/00* (2013.01); *B82Y 40/00* (2013.01); *C01B 31/043* (2013.01); *C01B 31/0438* (2013.01); *C01B 31/0469* (2013.01); *C04B 35/521* (2013.01); *C04B 35/522* (2013.01); *H01B 1/04* (2013.01); *C01B 31/0484* (2013.01); *C01B 31/0492* (2013.01); *C01B 2204/04* (2013.01); *C01B 2204/22* (2013.01); *C01B 2204/24* (2013.01)

(58) Field of Classification Search
CPC ................... B82Y 30/00; B82Y 40/00; C01B 31/0423–31/0492; C04B 35/521–35/522; H01B 1/04

USPC .................. 428/220; 423/445 R–447.2, 448; 977/734, 751–755

See application file for complete search history.

(56) References Cited

U.S. PATENT DOCUMENTS

| | | | |
|---|---|---|---|
| 3,404,061 A | 10/1968 | Shane et al. | |
| 3,725,110 A * | 4/1973 | Rodgers et al. | ............ 428/307.7 |
| 6,596,396 B2 * | 7/2003 | Hirata et al. | ................... 428/402 |
| 6,746,982 B2 * | 6/2004 | Hertel et al. | ................... 502/180 |
| 7,071,258 B1 | 7/2006 | Jang et al. | |
| 2004/0089851 A1* | 5/2004 | Wang et al. | ................... 252/500 |
| 2007/0284557 A1* | 12/2007 | Gruner et al. | .................. 252/500 |

OTHER PUBLICATIONS

Wong et al. "Graphene Nanoplatelet Reinforced Polymer Coatings". Society of Plastics Engineers ANTEC 2004; pp. 1733-1737.*
U.S. Appl. No. 10/858,814, filed Jun. 3, 2004, Jang, et al.
U.S. Appl. No. 11/509,424, filed Aug. 25, 2006, Jang, et al.

(Continued)

*Primary Examiner* — Prashant J Khatri
(74) *Attorney, Agent, or Firm* — Mark Levy; Thompson Hines

(57) ABSTRACT

Disclosed is a nano-scaled graphene article comprising a non-woven aggregate of nano-scaled graphene platelets wherein each of the platelets comprises a graphene sheet or multiple graphene sheets and the platelets have a thickness no greater than 100 nm (preferably smaller than 10 nm) and platelets contact other platelets to define a plurality of conductive pathways along the article. The article has an exceptional thermal conductivity (typically greater than 500 $Wm^{-1}K^{-1}$) and excellent electrical conductivity (typically greater than 1,000 S/cm). Thin-film articles of the present invention can be used for thermal management in microelectronic devices and for current-dissipating on an aircraft skin against lightning strikes.

35 Claims, 8 Drawing Sheets

(56) References Cited

OTHER PUBLICATIONS

K. S. Novoselov, et al., "Electric Field Effect in Atomically Thin Carbon Films," Science 306 (2004) 666-669.

H. B. Heersche, et al., "Bipolar Supercurrent in Graphene," Nature, 446 (Mar. 2007) 56-59.

Y. Zhang, Y-W, Tan, H. L. Stormer and P. Kim, "Experimental Observation of the Quantum Hall Effect and Berry's Phase in Graphene," Nature, 438 (2005) 201-204.

Y. Zhang, J. P. Small, M. E. Amori, and P. Kim, "Electric Field Modulation of Galvanomagnetic Properties of Mesoscopic Graphite," Phys. Rev. Lett., 94 (2005) 176803.

C. Berger, et al., "Ultrathin Epitaxial Graphite: Two-dim Electron Gas Prop. and a Route toward Graphene-based Nanoelectronics," J. Phys. Chem. B 108 (2004) 19912-19916.

G. H. Chen, W. Weng, D. Wu, C. Wu, J. Lu, P. Wang, X. Chen, "Preparation and Characterization of Graphite Nanosheets from Ultrasonic Powdering Technique," Carbon, 42 (2004) 75.

H. Fukushima and L. T. Drzal, "Graphite Nanoplatelets As Reinforcements for Polymers: Structural and Electrical Properties," Proc. of the 17th Annual Conf. of the Am. Soc. For.

H. Fukushima, S. H. Lee, and L. T. Drzal, "Graphite Platelet/Nylon Nanocomposites," Proc. of SPE ANTEC (2004) 1441-1445.

W. Zheng, S. C. Wong, and H. J. Sue, "Transport behavior of PMMA/expanded graphite nanocomposites," Polymer, 73 (2002) 6767.

A. Yasmin and I. M. Daniel, "Mechanical and thermal Properties of Graphite Platelet/Epoxy Composites," Polymer, 45 (2004) 8211-8219.

M. J. McAllister, et al. "Single Sheet Functionalized Graphene by Oxidation and Thermal Expansion of Graphite," Chem. Materials, 19 (Mar. 14, 2007) 4396-4404.

C. Gómez-Navarro, et al. "Electronic Transport Properties of Individual Chemically Reduced Graphene Oxide Sheets," Nano Lett., 7 (11), 3499-3503 (2007).

* cited by examiner

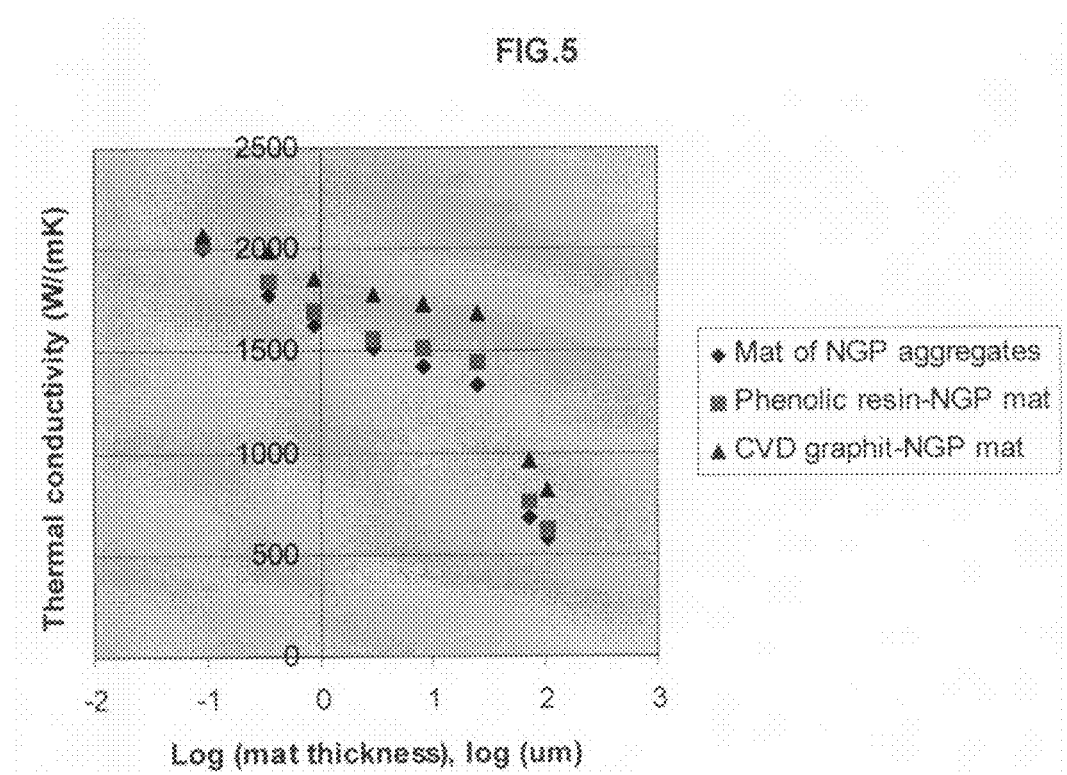

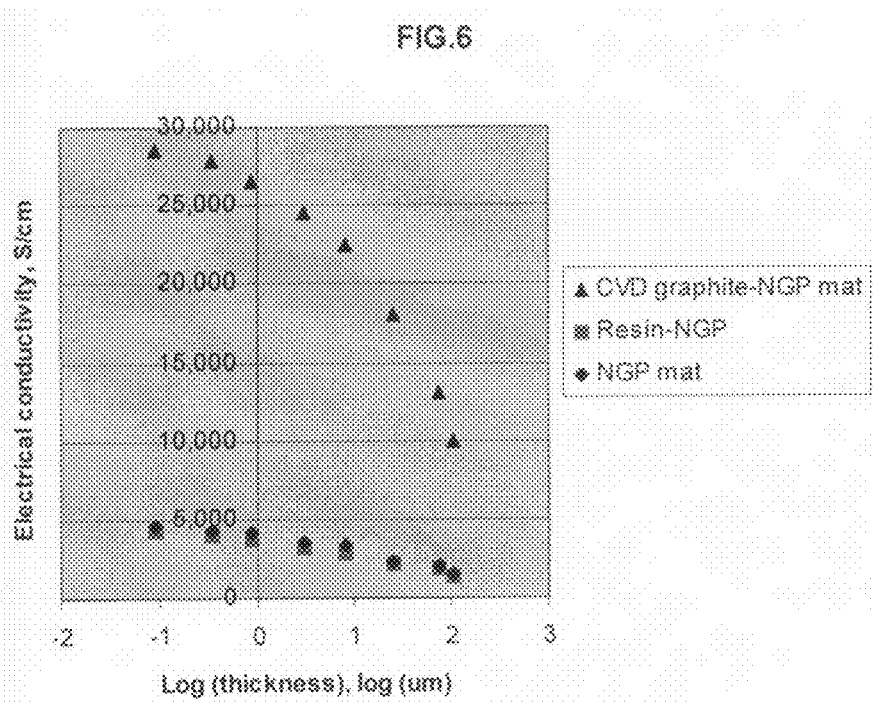

NANO-SCALED GRAPHENE PLATE FILMS AND ARTICLES

This invention is based on the results of a research project sponsored by the US DOE SBIR Program. The US government has certain rights on this invention.

FIELD OF THE INVENTION

The present invention relates generally to the field of nano materials, and more particularly to nano-graphene plate films and articles.

BACKGROUND OF THE INVENTION

Carbon is known to have four unique crystalline structures, including diamond, graphite, fullerene and carbon nano-tubes. The carbon nano-tube (CNT) refers to a tubular structure grown with a single wall or multi-wall, which can be conceptually obtained by rolling up a graphene sheet or several graphene sheets to form a concentric hollow structure. A graphene sheet is composed of carbon atoms occupying a two-dimensional hexagonal lattice. Carbon nano-tubes have a diameter on the order of a few nanometers to a few hundred nanometers. Carbon nano-tubes can function as either a conductor or a semiconductor, depending on the rolled shape and the diameter of the tubes. Its longitudinal, hollow structure imparts unique mechanical, electrical and chemical properties to the material. Carbon nano-tubes are believed to have great potential for use in field emission devices, hydrogen fuel storage, rechargeable battery electrodes, and composite reinforcements.

However, CNTs are extremely expensive due to the low yield and low production and purification rates commonly associated with all of the current CNT preparation processes. The high material costs have significantly hindered the widespread application of CNTs. Rather than trying to discover much lower-cost processes for nano-tubes, we have worked diligently to develop alternative nano-scaled carbon materials that exhibit comparable properties, but can be produced in larger quantities and at much lower costs. This development work has led to the discovery of processes for producing individual nano-scaled graphite planes (individual graphene sheets) and stacks of multiple nano-scaled graphene sheets, which are collectively called "nano-scaled graphene plates (NGPs)." Our invented processes include, as examples, (1) B. Z. Jang and W. C. Huang, "Nano-scaled Graphene Plates," U.S. Pat. No. 7,071,258 (Jul. 4, 2006)]; (2) B. Z. Jang, et al. "Process for Producing Nano-scaled Graphene Plates," U.S. patent pending, Ser. No. 10/858,814 (Jun. 3, 2004); and (3) Bor Z. Jang, Aruna Zhamu, and Jiusheng Guo, "Process for Producing Nano-scaled Platelets and Nanocomposites," US Pat. Pending, Ser. No. 11/509,424 (Aug. 25, 2006). NGPs could provide unique opportunities for solid state scientists to study the structures and properties of nano carbon materials. The structures of these materials may be best visualized by making a longitudinal scission on the single-wall or multi-wall of a nano-tube along its tube axis direction and then flattening up the resulting sheet or plate (FIG. 2). Studies on the structure-property relationship in isolated NGPs could provide insight into the properties of a fullerene structure or nano-tube. Furthermore, these nano materials could potentially become cost-effective substitutes for carbon nano-tubes or other types of nano-rods for various scientific and engineering applications.

For instance, the following researchers have pointed out the great potential of using NGPs as a new microelectronic device substrate material or a functional material:
1. K. S. Novoselov, et al., "Electric Field Effect in Atomically Thin Carbon Films," *Science* 306 (2004) 666-669.
2. H. B. Heersche, et al., "Bipolar Supercurrent in Graphene," *Nature*, 446 (March 2007) 56-59.
3. Y. Zhang, Y-W, Tan, H. L. Stormer and P. Kim, "Experimental Observation of the Quantum Hall Effect and Berry's Phase in Graphene," *Nature*, 438 (2005) 201-204.
4. Y. Zhang, J. P. Small, M. E. Amori, and P. Kim, "Electric Field Modulation of Galvanomagnetic Properties of Mesoscopic Graphite," *Phys. Rev. Lett.*, 94 (2005) 176803.
5. C. Berger, et al., "Ultrathin Epitaxial Graphite: Two-dimensional Electron Gas Properties and a Route toward Graphene-based Nanoelectronics," *J. Phys. Chem. B* 108 (2004) 19912-19916.
6. G. H. Chen, W. Weng, D. Wu, C. Wu, J. Lu, P. Wang, X. Chen, "Preparation and Characterization of Graphite Nanosheets from Ultrasonic Powdering Technique," *Carbon*, 42 (2004) 753-759.
7. H. Fukushima and L. T. Drzal, "Graphite Nanoplatelets As Reinforcements for Polymers: Structural and Electrical Properties," *Proc. Of the 17$^{th}$ Annual Conf. of the Am. Soc. For Composites*, Purdue University, (2003).
8. H. Fukushima, S. H. Lee, and L. T. Drzal, "Graphite Platelet/Nylon Nanocomposites," Proc. of SPE ANTEC (2004) 1441-1445.
9. W. Zheng, et al, "Transport Behavior of PMMA/Expanded Graphite Nanocomposites," *Polymer*, 73 (2002) 6767-6773.
10. A. Yasmin and I. M. Daniel, "Mechanical and Thermal Properties of Graphite Platelet/Epoxy Composites," *Polymer*, 45 (2004) 8211-8219.

The NGP material can be used as a nano-scaled reinforcement for a matrix material to obtain a nanocomposite. Advantages of nano-scaled reinforcements in a matrix material include: (1) when nano-scaled fillers are finely dispersed in a polymer matrix, the tremendously high surface area could contribute to polymer chain confinement effects, possibly leading to a higher glass transition temperature, stiffness and strength; (2) nano-scaled fillers provide an extraordinarily zigzagging, tortuous diffusion path that results in enhanced barrier or resistance against permeation of moisture, oxygen, other gases, and liquid chemical agents. Such a tortuous structure also serves as an effective strain energy dissipation mechanism associated with micro-crack propagation in a brittle matrix such as ceramic, glass, or carbon; (3) nano-scaled fillers can also enhance the electrical and thermal conductivities in a polymer, ceramic or glass matrix; and (4) carbon-based nano-scaled fillers have excellent thermal protection properties and, if incorporated in a matrix material, could potentially eliminate the need for a thermal protective layer, for instance, in rocket motor applications.

It may be noted that exfoliated graphite flakes (EGFs) are typically obtained by intercalating natural graphite flakes with strong acids to obtain a graphite intercalation compound (GIC). With a sudden exposure to a temperature in the range of 800-1050° C., the GIC expands by a factor of 30-300 to form a "worm," which is a collection of exfoliated, but largely unseparated graphite flakes. These EGFs are often re-compressed to obtain flexible graphite sheets that typically have a thickness in the range of 0.125 mm (125 µm)-0.5 mm (500 µm).

It may be further noted that EGFs, if fully separated from one another and having a thickness smaller than 100 nm, are considered as nano-scaled graphene platelets (NGPs). It has been recently recognized by researchers in the field of composites that thin, presumably separated EGFs with an extremely high aspect ratio (length/thickness ratio>100~1000), lead to a lower percolation threshold (typically 1-4% by weight EGF) for forming an electron-conducting path as compared to a threshold of typically 5-20% for other types of graphite particles. However, at these threshold EGF loadings, the electrical conductivity of the resulting composite, typically in the range of $10^{-5}$-$10^{-1}$ S/cm, is still too low to be used for many engineering applications. For instance, the US Department of Energy (DOE) has set forth a target bulk conductivity of 100 S/cm for composite-based fuel cell bipolar plates.

Conventional EGF composites typically contain many substantially unseparated graphite flakes, many of which are thicker than 100 nm. These composites with a high EGF loading either can not be formed into thin composite plate, can not be molded with mass production techniques, or are simply not processable into useful products. Although one would expect the electrical conductivity of an EGF composite to become higher if the EGF loading is greater (e.g., >20% by weight), no composite containing more than 20% by weight of well-dispersed, fully separated EG flakes has hitherto been reported. A need exists for a cost-effective method of preparing EGF/polymer composites with a high EGF loading.

Thus, it is an object of the present invention to provide a highly conductive, thin-film article comprising NGPs or fully separated EGFs wherein the article has a thickness thinner than 50 μm, but could be as thin as 0.1 μm. The thermal conductivity of the thin-film article is greater than 500 W/mK and, in many cases, greater than 1,000 W/mK.

It is another object of the present invention to provide a thin-film article, preferably in a non-woven mat form, comprising NGPs or fully separated EGFs wherein individual platelets or flakes have a thickness smaller than 10 nm.

It is yet another object of the present invention to provide a highly conductive thin-film article comprising NGPs or fully separated EGFs wherein the in-plane thermal conductivity is greater than 500 W/mK and in plane electrical conductivity is greater than 1,000 S/cm.

It is yet another object of the present invention to provide a composite comprising fully separated graphite platelets that are smaller than 100 nm in thickness (preferably smaller than 10 nm) and wherein the weight fraction of platelets is no less than 75%, preferably no less than 85%.

Still another object of the present invention is to provide a composite comprising at least 75% by weight of fully separated graphite platelets wherein the composite has an electrical conductivity greater than 200 S/cm, preferably greater than 500 S/cm.

A specific object of the present invention is to provide a composite comprising at least 75% by weight of fully separated graphite platelets wherein the composite has a thermal conductivity greater than 400 W/mK, preferably greater than 1,000 W/mK.

SUMMARY OF THE INVENTION

In summary, the present invention provides a nano-scaled graphene article comprising a non-woven aggregate of nano-scaled graphene platelets wherein each of the platelets comprises a graphene sheet or multiple graphene sheets and the platelets have a thickness no greater than 100 nm, and wherein platelets contact other platelets to define a plurality of conductive pathways along the article. Preferably, the article is a thin film with a thickness smaller than 50 μm and the platelets have an average thickness no greater than 10 nm. The platelets in the aggregate are preferably closely packed in such a manner that very little space exists between platelets. The article has a thermal conductivity greater than 500 $Wm^{-1}K^{-1}$, preferably and typically greater than 1,000 $Wm^{-1}K^{-1}$, and in many cases, greater than 1500 $Wm^{-1}K^{-1}$. Further, the article has an electrical conductivity greater than 1,000 S/cm, typically greater than 3,000 S/cm and, in many cases, greater than 4,000 S/cm.

The article may further comprise a desired amount of a nano-scaled filler selected from the group consisting of a carbon nanotube, carbon nano fiber, carbon black, metal nano-powder, and combinations thereof, wherein the amount is preferably no less than 0.1% by weight and no greater than 50% by weight based on the total weight of the nano-scaled filler and the nano-scaled graphene platelets.

The article, in the form of a thin non-woven mat or aggregate of NGPs, may comprise a matrix or binder material that impregnates or infiltrates the article to form a composite article. The composite article tends to have an improved thermal conductivity. Pyrolytic graphite-infiltrated mat has exceptionally high thermal conductivity that has not been achieved by other graphite materials.

BRIEF DESCRIPTION OF THE DRAWINGS

FIG. 5 In-plane thermal conductivity values of a non-woven mat of expanded, separated graphite flakes or NGPs (data denoted by a solid diamond, ♦), a phenolic resin-impregnated mat (solid square, ■), and a CVD pyrolitic graphite impregnated mat (solid triangle ▲), plotted as a function of the mat thickness on a 10-based log scale.

FIG. 6 In-plane electrical conductivity values of a non-woven mat of expanded, separated graphite flakes or NGPs (data denoted by a solid diamond, ♦), a phenolic resin-impregnated mat (solid square, ■), and a CVD pyrolitic graphite impregnated mat (solid triangle ▲), plotted as a function of mat thickness on a 10-based log scale.

DESCRIPTION OF THE PREFERRED EMBODIMENTS

Graphite is made up of layer planes of hexagonal networks of carbon atoms. These layer planes of hexagonally arranged carbon atoms are substantially flat and are oriented or ordered so as to be substantially parallel and equidistant to one another. These layers of carbon atoms, commonly referred to as graphene layers or basal planes, are weakly bonded together in their thickness direction by weak van der Waals forces and groups of these graphene layers are arranged in crystallites. Highly ordered graphites consist of crystallites of considerable size: the crystallites being highly aligned or oriented with respect to each other and having well ordered carbon layers. These anisotropic structures give rise to many properties that are highly directional such as thermal and electrical conductivity.

The graphite structure is usually characterized in terms of two axes or directions: the "c" axis or direction and the "a" axes or directions. The "c" axis is the direction perpendicular to the basal planes. The "a" axes are the directions parallel to the basal planes (perpendicular to the "c" direction). The graphites suitable for manufacturing flexible graphite sheets are typically natural graphite flakes that possess a very high degree of orientation.

Due to the weak van der Waals forces holding the parallel graphene layers, natural graphite can be treated so that the spacing between the graphene layers can be appreciably opened up so as to provide a marked expansion in the "c" direction, and thus form an expanded graphite structure in which the laminar character of the carbon layers is substantially retained. The process for manufacturing flexible graphite is well-known and the typical practice is described in U.S. Pat. No. 3,404,061 to Shane et al., the disclosure of which is incorporated herein by reference. In general, flakes of natural graphite are intercalated in an acid solution to produce graphite intercalation compounds (GICs). The GICs are washed, dried, and then exfoliated by exposure to a high temperature for a short period of time. This causes the flakes to expand or exfoliate in the "c" direction of the graphite up to 80-300 times of their original dimensions. The exfoliated graphite flakes are vermiform in appearance and, hence, are commonly referred to as worms. These worms of graphite flakes which have been greatly expanded can be formed without the use of a binder into cohesive or integrated sheets of expanded graphite, e.g. webs, papers, strips, tapes, foils, mats or the like (typically referred to as "flexible graphite") having a typical density of about 0.04-2.0 g/cm$^3$ for most applications.

Figure 1:
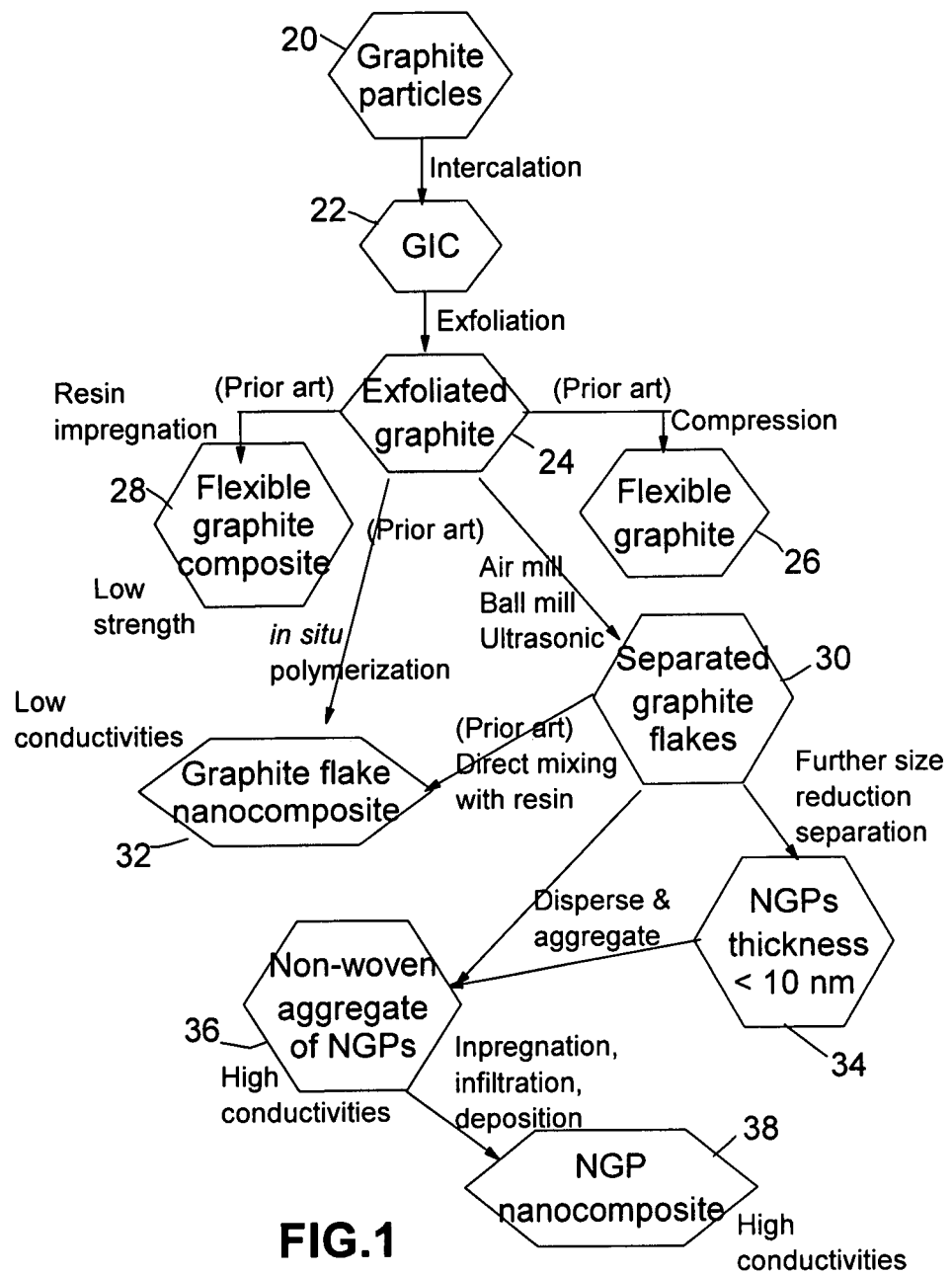
FIG. 1 A flow chart illustrating various prior art processes of producing exfoliated graphite products (flexible graphite and composites) and presently invented processes of producing a non-woven mat of aggregates of NGPs or fully separated EGFs.

FIG. 1 is a flow chart that illustrates the prior art processes used to fabricate flexible graphite, the resin-impregnated flexible graphite composite, and the conventional expanded graphite flake (EGF) composite that normally contains less than 15% by weight EGFs in a polymer matrix. The processes typically begin with intercalating graphite particles 20 (e.g., natural graphite or synthetic graphite flakes) with an intercalant (typically a strong acid or acid mixture) to obtain a graphite intercalant compound 22 (GIC). After rinsing in water to remove excess acid, the GIC becomes an expandable graphite. The GIC or expandable graphite is then exposed to a high temperature environment (e.g., in a tube furnace preset at a temperature in the range of 800-1,050° C.) for a short duration of time (typically for 15 seconds to 2 minutes). This thermal treatment allows the graphite to expand in its "c" direction by a factor of 30 to several hundreds to obtain a worm-like vermicular structure, which contains exfoliated, but largely unseparated graphite flakes 24 with large pores interposed between flakes.

In one prior art process, the exfoliated graphite is re-compressed by using a calendering or roll-pressing technique to obtain flexible graphite sheets or foils 26, which are typically much thicker than 100 μm. It seems that no flexible graphite sheet thinner than 75 μm has ever been reported in the open literature. Commercially available flexible graphite sheets normally have an in-plane electrical conductivity of 1-3×10$^3$ S/cm, through-plane (thickness-direction) electrical conductivity of 15-30 S/cm, in-plane thermal conductivity of 140-190 W/(mK), and through-plane thermal conductivity of approximately 5 W/(mK).

In another prior art process, the exfoliated graphite worm 24 may be impregnated with a resin and then compressed and cured to form a flexible graphite composite 28, which is normally of low strength. Alternatively, the exfoliated graphite worm may be impregnated with a monomer, which is then polymerized. This so-called "in situ polymerization" process also serves to partially separate the graphite flakes and the resulting graphite flake composite 32 tends to have relatively low thermal and electrical conductivities.

Figure 2A:
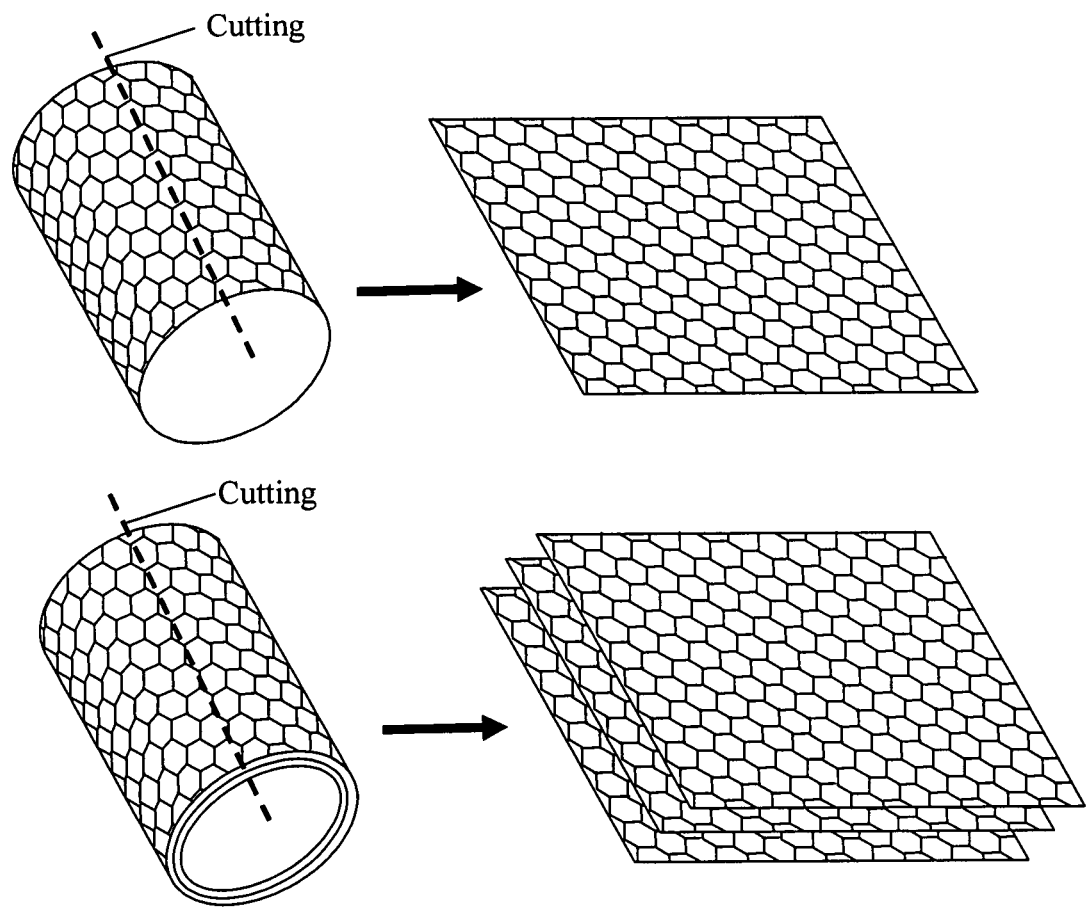
FIG. 2 (a) Schematic of NGP structures in comparison with CNT structures; (b) Atomic force microscopic image of selected NGPs.
Figure 2B:
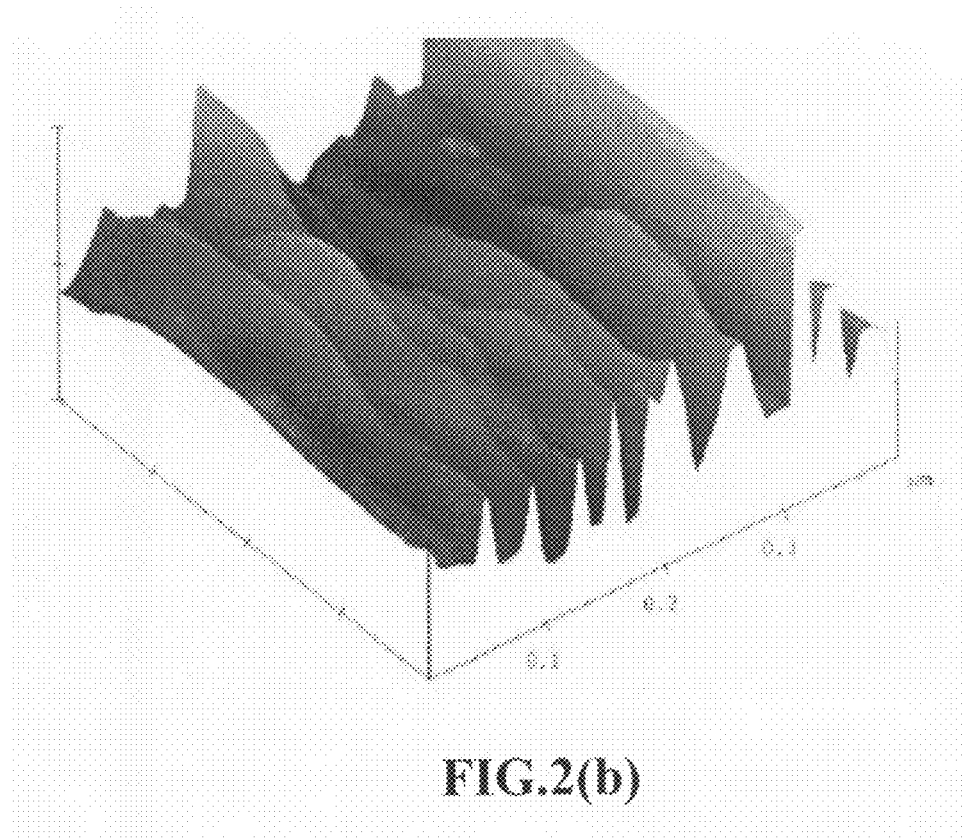

In a preferred embodiment of the present invention, the exfoliated graphite may be subjected to mechanical attrition/separation treatments using an air mill, ball mill, or ultrasonic device to produce separated graphite flakes 30, which may have some flakes thicker than 100 nm. These separated flakes 30 preferably are subjected to further separation and size reduction treatments to obtain nano-scaled graphene plates 34 (NGPs) with all the graphite platelets thinner than 100 nm, preferably thinner than 10 nm. An NGP is composed of a graphite sheet or a plurality of graphite sheets with each sheet being a two-dimensional, hexagonal carbon structure (FIG. 2(A)). Several NGPs are shown in an atomic force microscopic image, FIG. 2(B).

For the purpose of defining the geometry and orientation of an NGP, the NGP is described as having a length (the largest dimension), a width (the second largest dimension), and a thickness. The thickness is the smallest dimension, which is no greater than 100 nm, preferably smaller than 10 nm in the present context. When the platelet is approximately circular in shape, the length and width are referred to as diameter. In the presently defined NGPs, both the length and width can be smaller than 1 μm, but can be larger than 200 μm. Although expanded graphite flakes (EGFs) can have thickness greater than 100 nm, we prefer to use thin flakes or platelets that have a thickness smaller than 100 nm (most preferably thinner than 10 nm). The length and width of EGFs are normally greater than 1 μm, typically greater than 10 μm, and most typically between 10 μ and 200 μm.

Figure 4:
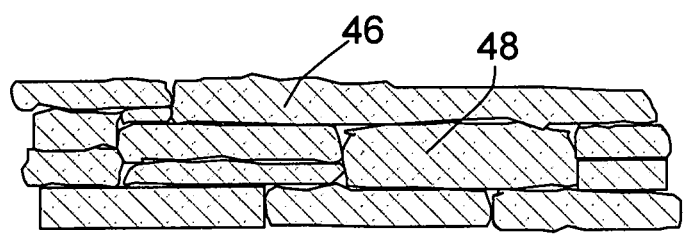
FIG. 4 Schematic of a non-woven, close-packed aggregate of separated EGFs or NGPs obtained by dispersing the EGFs or NGPs in a liquid medium to a relatively dilute state (e.g., <5% by weight of NGPs in water) and then re-assembling the platelets or flakes in a layer-wide manner to obtain a thin-film article.

The separated, expanded graphite flakes (EGFs) 30, preferably thinner than 100 nm, or the NGPs 34 (preferably thinner than 10 nm) are dispersed in a fluid (e.g., water) to produce a low concentration of flakes or platelets suspended in the fluid. The flake or platelet concentration is preferably lower than 10% by weight in the suspension (most preferably smaller than 5%). The suspension (or slurry) is allowed to undergo controlled aggregation using techniques like vacuum-assisted filtration, spin coating, or paper-making. The resulting non-woven aggregates 36 of graphite flakes or platelets are such that flakes/platelets contact other flakes/platelets to form a network of conductivity pathways. This non-woven article is preferably a thin film with a thickness less than 50 μm, preferably less than 10 μm, further preferably less than 1 μm and can be thinner than 0.1 μm (100 nm). The non-woven article may be further compressed by using a calendering or roll-pressing technique. The resulting thin film may be schematically shown in FIG. 4, wherein the thin-film structure is composed of close-packed flakes or platelets 46, 48.

Figure 3A:
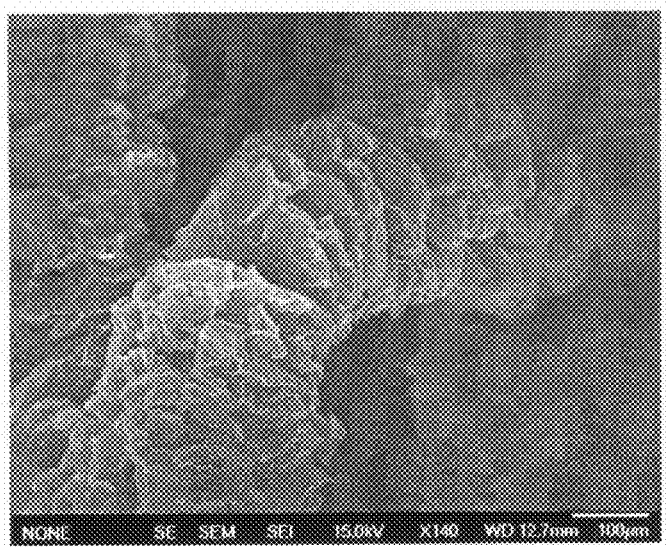
FIG. 3 (a) A SEM image of a graphite worm sample after exfoliation of graphite intercalation compounds (GICs); (b) Schematic of the exfoliated graphite flakes in a flexible graphite sheet, indicating that very many flakes are not aligned parallel to the two opposing surfaces of the flexible graphite sheet; (c) An SEM image of a cross-section of a flexible graphite sheet, confirming the non-parallel orientations of the constituent graphite flakes.
Figure 3B:
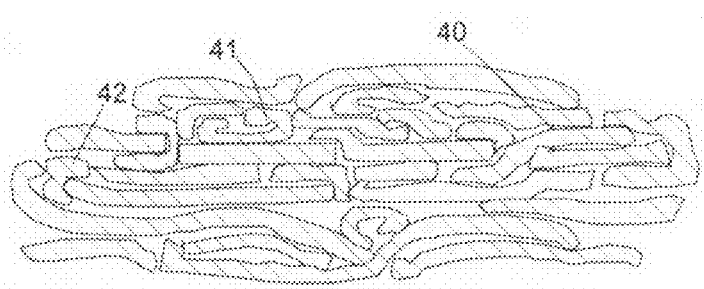
Figure 3C:
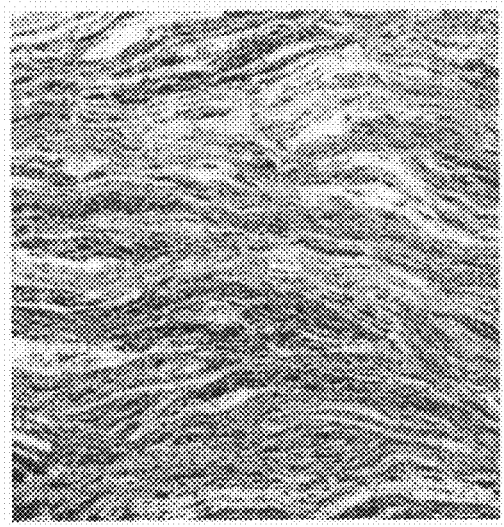

The worms (e.g., FIG. 3(A)) can be formed into integrated flexible graphite sheets by compression, without the use of any binding material, presumably due to the mechanical interlocking between the voluminously expanded graphite flakes. Although a significant proportion of these flakes are oriented in a direction largely parallel to the opposing surfaces of a flexible graphite sheet (as evidenced by the high degree of anisotropy with respect to thermal and electrical conductivity), many other flakes (e.g., as illustrated by 40, 41, 42 in FIG. 3(B)) are distorted, kinked, bent over, or oriented in a direction non-parallel to these sheet surfaces. This observation has been well demonstrated in many scanning electron micrographs (SEM) published in open or patent literature (e.g., FIG. 3(C)). As a consequence, the electrical or thermal conductivity of the resulting flexible graphite dramatically deviates from what would be expected of a perfect graphite single crystal or a graphene layer. For instance, the theoretical in-plane electrical conductivity and thermal conductivity of a graphene layer are predicted to be $1-5\times10^4$ S/cm and 2,000-3,000 W/(mK), respectively. However, the actual corresponding values for flexible graphite are $1-3\times10^3$ S/cm and 140-300 W/(mK), respectively; one order of magnitude lower than what could be achieved. By contrast, the corresponding values for the presently invented non-woven article of NGP aggregates are $3.4-5.5\times10^3$ S/cm and 580-2050 W/(mK), respectively (representative data given in FIG. 5 and FIG. 6 with data points denoted by a solid diamond, ♦).

Figure 7A:
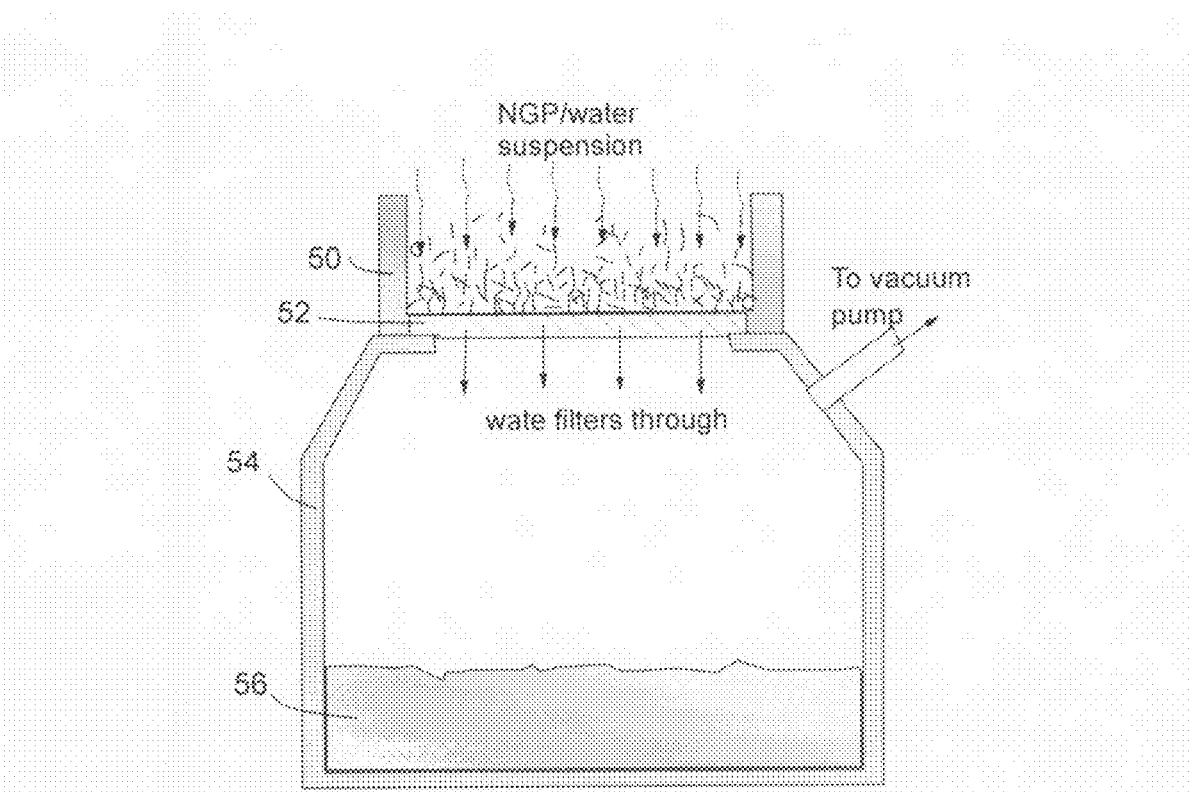
FIG. 7 (A) Schematic of a vacuum-assisted flake assembly apparatus for forming a non-woven, close-packed structure of NGP platelets; (B) Slurry spraying and filtration process for producing a non-woven article of NGPs.

The NGP aggregate-based non-woven article may be prepared using one of the following techniques:

A. Vacuum-Assisted Filtration and Subsequent Deposition, Impregnation, or Infiltration As schematically shown in FIG. 7(a), fully separated graphite flakes or NGP platelets may be dispersed in water to produce a dilute platelet suspension with the platelet concentration preferably lower than 5% by weight. This NGP-water suspension or slurry is then poured into a container 50. At the bottom of this container is a nano-filter 52 (with pore sizes preferably of 100 nm-500 nm); e.g., GE TefSep™ filtering membrane. Water filters through this membrane filter 52 and collected at the bottom 56 of a container 54. This container is connected to a vacuum line to promote the transport of water through the membrane.

It may be noted that the same apparatus may be used to impregnate the resulting non-woven mat with a resin or other type of matrix material (e.g., mesophase pitch or metal). Preferably, the nano-filter membrane is replaced by a regular filter paper after the non-woven mat is formed and dried. A resin (e.g., epoxy or phenolic resin), preferably diluted by a diluent first (e.g., acetone), is sprayed onto the top surface of the non-woven mat. The suction force created by the vacuum line will facilitate permeation of the resin through the mat. The diluent is dried and the resulting impregnated mat is then cured by heat to obtain a NGP mat-resin composite.

The non-woven mat of NGPs can be further modified with one or more of several surface treatment or volume infiltration techniques, e.g., chemical vapor deposition (or chemical vapor infiltration), electrodeposition, electro-less deposition, to tailor the structure and properties of the mat. An example is the chemical vapor deposition or infiltration of pyrolytic graphite on and in the mat. This can be done by introducing methane gas into a reactor that accommodates the NGP mat and allows chemical decomposition and carbon formation to occur at a temperature of 800-1500° C. first, then at a higher temperature up to 2,500-3,000° C. for a desired duration of time, typically from 1-10 hours.

Highly ordered pyrolytic graphites having densities near 2.2 g/cc and good thermal conductivity have been produced by vapor deposition of carbon. Highly oriented pyrolytic graphite (HOPG) may have a thermal conductivity on the order of 800 w/(mK). However, the HOPG materials by themselves are extremely fragile. In the present invention, only a small amount of pyrolytic graphite is needed in terms of infiltrating the non-woven NGP mat and NGPs provide high strength and stiffness.

Furthermore, the bulk graphite widely used commercially for fabricating articles such as crucibles and electrodes are largely amorphous, relatively low in density, and lacking the high thermal conductivity of crystal graphite. Some bulk graphites may be semi-crystalline with the crystalline component comprising large, randomly-oriented graphitic crystallites, generally greater in size than about 30 to 50 microns, embedded in a substantially amorphous carbon phase. These lower-density bulk graphite articles will generally exhibit only a fraction of the bulk thermal conductivity that characterizes highly organized crystalline graphite. By contrast, the pyrolytic graphite-modified NGP mat exhibits an exceptionally high thermal conductivity, typically higher than 1,500 W/(mK), which is 4-5 times higher than that of copper. This is an exceptional achievement!

The non-woven NGP mat may be infiltrated with mesophase or liquid crystal pitch, which may be readily transformed thermally into a more crystalline graphite. It is well-known that bulk mesophase pitch by itself, when processed in bulk into crystalline graphite, exhibits a bulk thermal conductivity considerably below that of crystal graphite. Surprisingly, the mesophase pitch, upon infiltration and pyrolization, imparts excellent conductivity to the non-woven mat. The resulting carbon-carbon composite (or, more accurately, graphite-graphite composite) have outstanding thermal and electrical conductivities (FIG. 5 and FIG. 6; data denoted by ▲).

B. Spin Coating or Casting of NGP-Liquid Suspension

In one preferred embodiment, a thin mat comprising overlapping or closely-packed NGPs or EGFs can be prepared by dispersing NGPs or EGFs in a liquid medium to form a suspension, which is followed by spin-coating or spin-casting. Although spin-casting or spin-coating of a polymer-solvent solution is well-known in the art, it has never been adapted for forming an NGP mat without a resin. Surprisingly, the resulting mat comprises graphene flakes or platelets that are closely packed together to have a relatively high density.

C. Slurry Spraying and Filtration

Figure 7B:
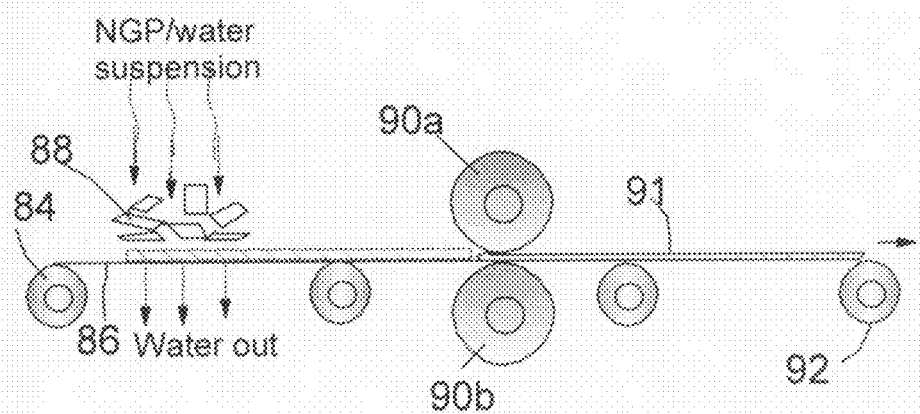

In another preferred embodiment of the present invention, a porous mat can be made by using a continuous platelet-water suspension spraying technique. For instance, as shown in FIG. 7(B), the process begins with pulling a web 86 (porous sheet) from a roller 84. The moving web receives a stream of slurry 88 (flakes+water) from above the web. Water sieves through the web with all NGPs remaining on the surface of the web. These solid ingredients are moved forward to go through a compaction stage by a pair of compaction rollers 90a, 90b. The roll-pressed mat 91 may be collected by a winding roller 92.

In addition to NGPs or EGFs, other conductive ingredient such as metal fibers, carbon nano-tubes, graphitic nano-fibers, carbon fibers, carbon blacks, or a combination thereof can be added to become part of a non-woven mat by using any of the aforementioned techniques. Preferably, these fillers occupy a weight fraction lower than 50%. The type and proportion of the conductive fillers are preferably chosen in such a way that they enhance other desired properties (e.g., mechanical integrity) without significantly compromising electrical and thermal conductivity of the resulting mat or its resin- or graphite-impregnated versions. All the NGP-based mats prepared by any of the aforementioned methods (B and C) can be subjected to resin/graphite impregnation or infiltration treatments as discussed in method A (vacuum-assisted filtration).

EXAMPLE 1

Preparation of Exfoliated Graphite and Separated Flakes

Natural flake graphite with an average diameter of 150 µm was used for preparing the exfoliated graphite. Concentrated sulfuric acid, nitric acid (chemically pure), glacial acetic acid, and potassium permanganate were used as the chemical intercalate and oxidizer to prepare graphite intercalation compounds (GICs). Chemically pure alcohol (95% by volume) and distilled water were used as a dispersing medium for the preparation of fully foliated and separated graphite flakes or NGPs.

Exfoliated graphite (EG) was prepared according to the following procedure: The natural flake graphite was first dried in a vacuum oven for 24 h at 80° C. Then, a mixture of concentrated sulfuric acid and fuming nitric acid (4:1, v/v) was slowly added, under appropriate cooling and stirring, to a three-neck flask containing graphite flakes. After 16 hurs of reaction, the acid-treated natural graphite was filtered and washed thoroughly with deionized water until the pH level of the solution reached 6. After being dried at 100° C. overnight, the resulting graphite intercalation compound (GIC) was subjected to a thermal shock at 1050° C. for 15 seconds in a muffle furnace to form exfoliated graphite (worms).

Five grams of the resulting EG were mixed with 2,000 ml alcohol solution consisting of alcohol and distilled water with a ratio of 65:35 for 12 hours to obtain a suspension. Then the mixture or suspension was subjected to ultrasonic irradiation with a power of 200 W for various times. After two hours of sonication, EG particles were effectively fragmented into thin expanded graphite flakes (EGFs). The suspension was then filtered and dried at 80° C. to remove residue solvents. The as-prepared EGFs are typically thinner than 30 nm and, hence, also referred to as nano-scaled graphene platelets (NGPs). These NGPs were then kept in a dry desiccator for testing and further use.

EXAMPLE 2

Preparation of Exfoliated Graphite and Separated Flakes

In this graphite intercalation route, the ratio among natural graphite, nitric acid, glacial acetic acid, and potassium permanganate was 1:1:0.8:0.06 by weight. The procedure began with mixing natural graphite particles with potassium permanganate in a glass beaker, which was cooled with an ice bath. Concentrated nitric acid was carefully poured into the beaker while the mixture was magnetically stirred. Then, glacial acetic acid was slowly added to the mixture using a pipette. After 21 hours of reaction, the acid-treated natural graphite was filtered and washed thoroughly with deionized water until the pH level of the solution reached 6. After being dried at 80° C. overnight, the resulting graphite intercalation compound was subjected to a thermal shock at 1050° C. for 15 seconds in a muffle furnace to form exfoliated graphite. Part of the exfoliated graphite worms was subjected to further size reduction and separation by using a high-intensity planetary ball mill for 24 hours.

EXAMPLE 3

Preparation of Exfoliated Graphite and Separated Flakes

The graphite intercalation procedure was similar to that used in Example 2, but nitric acid was replaced by sulfuric acid. The ratio among natural graphite, sulfuric acid, glacial acetic acid, and potassium permanganate was 1:0.5:2:0.07 by weight. After exfoliation at 1050° C. for 15 seconds, the expanded graphite worms were re-immersed in an intercalant solution for 21 hours, followed by washing, drying, and re-exfoliation again at 1050° C. for 15 seconds. The resulting graphite flakes are mostly thinner than 10 nm.

EXAMPLE 4

Preparation of Thin-Film Non-Woven Articles

The EGFs or NGPs prepared in Example 3 were used for the preparation of non-woven aggregates of EGFs wherein the flakes/platelets contact one another to form a network of multiple conductivity pathways. Fully separated graphite flakes or NGP platelets were dispersed in water to produce a dilute platelet suspension with the platelet concentration of approximately 4% by weight. Ultrasonic waves were employed to assist in the dispersion of NGPs in water. This NGP-water suspension or slurry was then poured into a container, as schematically shown in FIG. 7(a). At the bottom of this container is a nano-filter 52 (GE TefSep™ filtering membrane with pore sizes of approximately 200 nm). Water filters through this membrane filter 52 and collected at the bottom 56 of a container 54. A vacuum pump was utilized to assist in the transport of water through the membrane.

EXAMPLE 5

Preparation of Resin-Impregnated, Thin-Film Non-Woven Mat

The same apparatus was used to impregnate the resulting non-woven mat with a phenolic resin. The nano-filter membrane was replaced by a sheet of less expensive filter paper after the non-woven mat is formed and dried. Phenolic resin, diluted by acetone, was sprayed onto the top surface of the non-woven mat. Again, a vacuum pump was used to generate a suction force to facilitate the permeation of the resin through the mat. Acetone was allowed to vaporize at 60° C. under a chemical flume hood and the resulting impregnated mat was cured by heat to obtain a NGP mat-resin composite.

EXAMPLE 6

Preparation of Pyrolitic Graphite-Infiltrated Non-Woven Mat

The non-woven mat of NGPs can be modified with one or more of several surface treatment or volume infiltration techniques, e.g., chemical vapor deposition (or chemical vapor infiltration), electrodeposition, electro-less deposition, to tailor the structure and properties of the mat. Samples of non-woven mats obtained in Example 4 were subjected to chemical vapor deposition or infiltration of pyrolytic graphite. This was achieved by introducing methane gas into a reactor that accommodates the NGP mat and allows chemical decomposition and carbon formation to occur at a temperature of 1,000° C. first for 1 hour and then graphitized at a higher temperature of 3,000° C. for a 2 hours.

The in-plane and through-plane (thickness-direction) thermal and electrical conductivities of three series of NGP mats and their composites were investigated with the purposes of (a) comparing the properties of NGP mat, its resin-impregnated version, and its CVD graphite infiltrated version and (b) understanding how these properties vary with the mat or composite thickness. The through-plane thermal conductivity of all these samples are in the range of 14-15 W/(mK). As shown in FIG. 5, the in-plane thermal conductivity values of the NGP mat and composites increase as the thickness decreases. Several significant observations can be made from this figure:

(1) At a thickness of approximately 105 μm, the thermal conductivity of an NGP non-woven mat is 580 W/(mK), much higher than 140-190 W/(mK), the values commonly associated with commercially available flexible graphite.

(2) With fully separated, ultra-thin flakes or NGPs, we can obtain a non-woven mat of platelets much thinner than 100 μm (the practical lower limit of flexible graphite thickness). A sample as thinner than 100 nm can be readily obtained. Such a thin, well-packed NGP aggregate exhibits an exceptionally high thermal conductivity of approximately 2,000 W/(mK).

(3) Resin impregnation of the non-woven mat slightly increases the thermal conductivity. Chemical vapor infiltration of the NGP mat with pyrolytic graphite increases the thermal conductivity to a much greater extent. Surprisingly high thermal conductivity values were observed with the NGP mat densified with pyrolytic graphite; values as high as 4-5 times the conductivity of pure copper.

The in-plane electrical conductivity values of the NGP mat and composites increase as the thickness decreases, as shown in FIG. 6. Several significant observations can be made from this figure:

(1) At a thickness of approximately 105 μm, the electrical conductivity of an NGP non-woven mat is 3,450 S/cm, much higher than 1,100 S/cm, the values commonly associated with commercially available flexible graphite.

(2) An NGP-based non-woven mat 90 nm thick exhibits an in-plane electrical conductivity of approximately 6,540 S/cm.

(3) Resin impregnation of the non-woven mat appears to slightly decrease the thermal conductivity. Chemical vapor infiltration of the NGP mat with pyrolytic graphite significantly increases the electrical conductivity. Also quite surprisingly, very high electrical conductivity values (10,000-29,500 S/cm) were observed with the NGP mat densified with pyrolytic graphite.

In addition to carbon, graphite, and polymer, NGP mats may also be impregnated with or infiltrated by a metal, ceramic, or glass matrix. As indicated earlier, additional fillers (preferably nano-scaled) may be added to the NGP mats or composites to modify other properties such as friction, wear, strength, stiffness, and toughness. These nano-scaled fillers may be selected from the group consisting of carbon nanotubes, carbon nano fibers, carbon blacks, metal nano-powders, and combinations thereof.

In conclusion, we have successfully developed a new and novel class of highly conducting, non-woven materials and their nanocomposites that contain truly nano-scaled graphene platelets which have platelet thickness smaller than 100 nm. The thermal and electrical conductivities exhibited by the presently invented mat of NGPs are much higher than what prior art flexible graphite could achieve. The thermal and electrical conductivities exhibited by the presently invented mat of NGPs, infiltrated with CVD graphite, are among the highest that graphite-type materials could achieve.

We claim:

1. A nano-scaled graphene article comprising a compressed, close packed, non-woven aggregate of nano-scaled graphene platelets wherein each of the platelets comprises a graphene sheet and the platelets have a thickness no greater than 100 nm, and wherein platelets contact other platelets to define a plurality of conductive pathways along the article.

2. The nano-scaled graphene article as defined in claim 1 wherein said article has a thickness smaller than 50 μm and the platelets have a thickness smaller than 10 nm.

3. The nano-scaled graphene article as defined in claim 1 wherein said article has a thickness smaller than 1 μm and the platelets have a thickness smaller than 10 nm.

4. The nano-scaled graphene article as defined in claim 1 wherein said article has a thickness smaller than 100 nm.

5. The nano-scaled graphene article as defined in claim 1 wherein said article has a thermal conductivity greater than 1,000 $Wm^{-1}K^{-1}$.

6. The nano-scaled graphene article as defined in claim 1 wherein said article has a thermal conductivity greater than 1,500 $Wm^{-1}K^{-1}$.

7. The nano-scaled graphene article as defined in claim 1 wherein said article has an electrical conductivity greater than 3,000 S/cm.

8. The nano-scaled graphene article as defined in claim 1 wherein said article has an electrical conductivity greater than 3,000 S/cm and a thermal conductivity greater than 1,000 $Wm^{-1}K^{-1}$.

9. The nano-scaled graphene article as defined in claim 1 further comprising a desired amount of a nano-scaled filler, having at least one dimension smaller than 100 nm, selected from the group consisting of a carbon nanotube, carbon nano fiber, carbon black, metal nano-powder, and combinations thereof, wherein said amount is no less than 0.1% by weight based on the total weight of said nano-scaled filler and the nano-scaled graphene platelets.

10. The nano-scaled graphene article as defined in claim 9 wherein said nano-scaled filler occupies a weight fraction no greater than 20%.

11. The nano-scaled graphene article of claim 9 wherein, when the article contains a matrix or binder material, the compressed aggregate is infiltrated or impregnated by the matrix or binder material.

12. The nano-scaled graphene article as defined in claim 9 further comprising a matrix or binder material that impregnates or infiltrates said article to form a composite article, wherein said binder or matrix material is selected from a carbon, graphite, metal, glass, or ceramic material.

13. The nano-scaled graphene article as defined in claim 12 wherein said composite article has an electrical conductivity greater than 200 S/cm or a thermal conductivity greater than 300 $Wm^{-1}K^{-1}$.

14. The nano-scaled graphene article as defined in claim 12 wherein said composite article has an electrical conductivity greater than 300 S/cm or a thermal conductivity greater than 500 $Wm^{-1}K^{-1}$.

15. The nano-scaled graphene article of claim 12 wherein the weight fraction of the platelets is not less than 75%.

16. The nano-scaled graphene article as defined in claim 1 wherein the platelets are over-lapping.

17. The nano-scaled graphene article of claim 1 wherein, when the article contains a matrix or binder material, the compressed aggregate is infiltrated or impregnated by the matrix or binder material.

18. The nano-scaled graphene article as defined in claim 17 wherein the article further comprises a matrix or binder material that impregnates or infiltrates said article to form a composite article, wherein said binder or matrix material is selected from a carbon, graphite, metal, glass, or ceramic material.

19. The nano-scaled graphene article as defined in claim 18 wherein said composite article has an electrical conductivity greater than 200 S/cm or a thermal conductivity greater than 300 $Wm^{-1}K^{-1}$.

20. The nano-scaled graphene article as defined in claim 18 wherein said composite article has an electrical conductivity greater than 300 S/cm or a thermal conductivity greater than 500 $Wm^{-1}K^{-1}$.

21. The nano-scaled graphene article of claim 18 wherein the weight fraction of the platelets is not less than 75%.

22. The nano-scaled graphene article of claim 1 wherein the aggregate is a thin film having a thickness no greater than 100 μm or paper.

23. The nano-scaled graphene article as defined in claim 1 wherein the aggregate is formed by dispersing separated platelets in a liquid medium and re-assembling the platelets in a layer by removing the liquid medium.

24. A nano-scaled graphene platelet-containing article comprising a compressed, close packed, non-woven aggregate of nano-scaled graphene platelets to form an electrical network of platelets in contact with other platelets to define a plurality of conductive pathways along the article wherein the article has an electrical conductivity no less than 200 S/cm or a thermal conductivity no less than 400 $Wm^{-1}K^{-1}$.

25. The nano-scaled graphene article of claim 24 wherein the article has an electrical conductivity no less than 1,000 S/cm or a thermal conductivity no less than 500 $Wm^{-1}K^{-1}$.

26. The nano-scaled graphene article as defined in claim 24 further comprising a matrix or binder material that impregnates or infiltrates said article to form a composite article.

27. The nano-scaled graphene article as defined in claim 26 wherein said composite article has an electrical conductivity greater than 1,000 S/cm or a thermal conductivity greater than 500 $Wm^{-1}K^{-1}$.

28. The nano-scaled graphene article as defined in claim 26 wherein said composite article has an electrical conductivity greater than 2,000 S/cm or a thermal conductivity greater than 1,000 $Wm^{-1}K^{-1}$.

29. The nano-scaled graphene article as defined in claim 26 wherein said binder or matrix material is selected from a resin, carbon, graphite, metal, glass, or ceramic material.

30. The nano-scaled graphene article as defined in claim 24 further comprising a desired amount of a nano-scaled filler selected from the group consisting of a carbon nanotube, carbon nano fiber, carbon black, metal nano-powder, and combinations thereof wherein said amount is no less than 0.1% by weight based on the total weight of said nano-scaled filler and the nano-scaled graphene platelets.

31. The nano-scaled graphene article of claim 24 wherein the weight fraction of the platelets is not less than 75%.

32. The nano-scaled graphene article of claim 24 wherein, when the article contains a matrix or binder material, the matrix or binder material infiltrates or impregnates the compressed aggregate.

33. The nano-scaled graphene article of claim 32 wherein the weight fraction of the platelets is not less than 75%.

34. The nano-scaled graphene article of claim 24 wherein the aggregate is a thin film having a thickness no greater than 100 μm or paper.

35. A nano-scaled graphene article comprising a compressed, close packed, non-woven aggregate of nano-scaled graphene platelets wherein the aggregate is formed by dispersing nano-scaled graphene platelets in a liquid medium and re-assembling the platelets in a layer by removing the liquid medium, each of the platelets comprises a graphene sheet and the platelets have a thickness not greater than 100 nm, and wherein the compressed aggregate is infiltrated by a binder or matrix material, and the aggregate may additionally include a filler, and wherein the weight fraction of the platelets is not less than 75%.

* * * * *